United States Patent [19]
Buhayar

[11] 3,847,273
[45] Nov. 12, 1974

[54] TURNING DEVICE FOR FLEXIBLE WEB PRODUCT

[75] Inventor: Eric S. Buhayar, Swarthmore, Pa.

[73] Assignee: Scott Paper Company, Philadelphia, Pa.

[22] Filed: Apr. 2, 1973

[21] Appl. No.: 346,934

[52] U.S. Cl............... 198/236, 198/25, 198/165, 198/178, 198/242, 198/245
[51] Int. Cl............................................ B65g 47/24
[58] Field of Search......... 198/33 AB, 178, 210, 25, 198/165

[56] References Cited
UNITED STATES PATENTS

| | | | |
|---|---|---|---|
| 375,036 | 12/1887 | Williams | 198/210 |
| 2,643,778 | 6/1953 | Socke | 198/210 |
| 3,200,936 | 8/1965 | Briggs | 198/178 |
| 3,269,516 | 8/1966 | Lucas | 198/33 AB |
| 3,390,756 | 7/1968 | Edwards et al. | 198/210 |
| 3,421,758 | 1/1969 | Cole | 198/210 |
| 3,431,828 | 3/1969 | Crawford et al. | 198/178 |
| 3,747,737 | 7/1973 | Brooke | 198/33 AB |

*Primary Examiner*—Richard A. Schacher
*Assistant Examiner*—Richard K. Thomson
*Attorney, Agent, or Firm*—Martin L. Faigus; William J. Foley

[57] ABSTRACT

An apparatus for turning a moving discrete flexible web product includes an inlet conveyor, a turning station and an outlet conveyor. The turning station includes a low coefficient-of-friction, concave, substantially cylindrical support surface for supporting a face of the web product. A turning head having web-product engaging means is moved along a path concentric with, and closely spaced to the support surface for confining at least a portion of the web product between the web-product engaging means and the support surface and for moving the web product along the support surface. Actuating means is associated with the turning head for rotating the turning head through a predetermined number of degrees about an axis substantially perpendicular to the confined web product to thereby turn the web product through substantially the same number of degrees as the turning head. The inlet conveyor grips an arriving web product as it is moving in a linear direction and feeds it tangentially onto the turning surface. The outlet conveyor grips the web product after it has been turned and directs the web product off of the turning surface in substantially the same linear direction that it had on arrival at the inlet conveyor.

10 Claims, 8 Drawing Figures

TURNING DEVICE FOR FLEXIBLE WEB PRODUCT

BACKGROUND OF THE INVENTION

1. Field of the Invention

This invention relates to a device for turning a moving discrete, flexible web product substantially in its own plane through a predetermined arc. Reference to "web product" throughout this application refers to a product formed from a single web, as well as to assemblages including one or more webs, such as a disposable diaper.

2. Description of the Prior Art

In the manufacture of flexible web products on high speed converting equipment, it is usually considered more desirable to perform folding and/or gluing steps on the longitudinal edges of the web products, rather than on transverse edges with respect to their path of travel as they are conveyed through the equipment. In such equipment a device is included to turn the web products through a predetermined arc while the web products are in motion. For example, in the manufacture of disposable diapers of the type described and claimed in the application of Evelyn H. Krusko, Ser. No. 23,752, filed Mar. 30, 1970, now U.S. Pat. No. 3,721,242, and commonly owned by the assignee of the present invention, an absorbent fluff batt is enclosed by a bottom sheet and a fluid pervious top sheet. In the fabrication of this diaper it is desirable to fold the longer side edges inwardly for ease of packaging. According to one method of manufacture the elements of the diaper are assembled with the long dimension of the diaper extending in the cross-machine-direction of product travel. Therefore, prior to the folding operation the diaper must be rotated through an arc of approximately 90° in order to position the long edges of the diaper in the machine-direction of travel.

U.S. Pat. No. 3,189,158, issued to Lucas on June 15, 1965, and U.S. Pat. No. 1,765,419, issued to Goss on June 24, 1930, disclose devices for turning moving products substantially within their own plane through a predetermined arc. These patents represent the prior art thinking of directing the products in a horizontal plane through all of the converting operations, including the turning operation. The turning device disclosed in each of the above patents includes a substantially planar support surface disposed in a horizontal plane for supporting the products as they are turned through a predetermined arc. An endless chain conveyor has a plurality of turning heads attached thereto; each turning head having a product-engaging surface associated therewith. The endless chain conveyor is in wrapping engagement with spaced sprockets to establish an upper chain run and a lower chain run. The product-engaging surfaces in the lower chain run are disposed in a horizontal plane closely spaced to the horizontal support surface for confining the product against the support surface. As a turning head mounted to the chain conveyor moves about an end sprocket to enter the lower chain run the leading edge of the product-engaging surface of said turning head can dig into the product and thereby damage said product. This occurs because the leading edge of the product-engaging surface assumes a closer position to the support surface when the turning head is moving about the end sprocket then when the turning head is completely disposed within the lower chain run. This digging effect can be minimized by establishing a large turning radius for the turning head about the sprocket relative to the radius of the turning head itself. However, practical machine-design considerations to conserve plant space are a limiting factor on the size of the sprockets which can be utilized, and therefore, is a limiting factor on the arc, or turning radius of the turning head about the sprocket.

Chain-borne mechanisms, such as those employed in the Goss and Lucas patents to support the turning heads, are unreliable and speed limited. To further explain, the relative movement between chain links causes excessive wear of said links, especially when one attempts to run the apparatus at high speeds. Therefore frequent replacement of chain links is required.

When rotating devices are employed in conjunction with further downstream equipment, it is important that the turning devices turn the web products with a minimum deterioration of the time/space relationship between them. To achieve this objective, the position of the individual turning heads must be precisely controlled so as to effect engagement of each web product at substantially the same location. This requires a substantially rigid mounting for the turning heads. Such a rigid mounting is not achieved in chain-mounted devices, in the absence of additional supporting structure. Employing additional supporting structure, such as guide tracks, complicates the equipment. Moreover, dust and other foreign matter can collect on the supporting structure and be brushed off onto the web products to thereby contaminate said web products.

SUMMARY OF THE INVENTION

The apparatus of this invention for turning a moving discrete flexible web product through a predetermined arc within its own plane includes a low coefficient-of-friction support surface having a concave, substantially cylindrical configuration in the direction of product movement. A turning head has web-product engaging means which is moved along a path concentric with, and closely spaced to the substantially cylindrical support surface for confining a web product and moving it along said support surface. Actuation means are associated with the turning head for rotating said turning head a predetermined number of degrees about an axis substantially perpendicular to the confined web product for rotating the web product, in its own plane, through a predetermined arc as said web product is being moved over the support surface.

In the preferred embodiment of this invention an inlet conveyor is positioned upstream of the concave support surface for receiving a web product in a substantially horizontal plane and directing said web product tangentially onto the support surface. Also, in the preferred embodiment of this invention, an outlet conveyor is positioned adjacent the downstream end of the support surface for receiving a web product moving tangentially to the support surface and directing the web product off of the support surface into a substantially horizontal plane to be worked upon by subsequent downstream converting equipment.

In the preferred embodiment of this invention a plurality of discrete, flexible web products are received on the support surface in single file order from the inlet conveyor, and a plurality of turning heads are attached to supporting shafts which are rotatably mounted about their axes within a rigid cylindrical turret, and such shafts radiate from the turret in a spoke-like arrangement. The turret is mounted for rotation about an axle to direct each turning head into engagement with a single web product. The mounting of each shaft to a rigid turret, as opposed to a flexible chain mounting, establishes positive control of the position of each of the turning heads. In this manner the turning heads will engage the web products in a controlled manner to prevent deterioration of the space/time relationship between adjacent products.

In applicant's apparatus the concave, substantially cylindrical support surface is provided with a relatively large radius of curvature (e.g. approximately 2 feet) without the apparatus occupying an excessive amount of plant space. Accordingly, the concentric path of movement of the turning heads, by virtue of being relatively close to the support surface, will travel through a relatively large radius relative to the radius of each turning head to thereby prevent the leading edge of the web-product engaging surface of each turning head from digging into the web product as it initially engages said web product at an upstream end of the support surface. Furthermore, in applicant's apparatus chain-borne mechanisms are avoided to thereby eliminate the inherent deficiencies of devices employing such mechanisms, as discussed above.

Prior to applicant's invention it was thought to be undesirable to attempt to rotate a substantially flat web product through a predetermined arc within its own plane as it was moved over a curved surface. Specifically, it was thought that the web product could not be adequately confined between a turning head and a curved support surface to achieve precise control over the position of the web product to establish proper alignment of the web product with subsequent downstream operating tools in the converting equipment. Applicant has found that his device is extremely reliable in operation, while consuming relatively little plant space.

Other objects and advantages of this invention will become apparent upon reading the detailed description which follows, taken in conjunction with the drawings.

DESCRIPTION OF THE PREFERRED EMBODIMENTS OF THIS INVENTION

Figure 1:
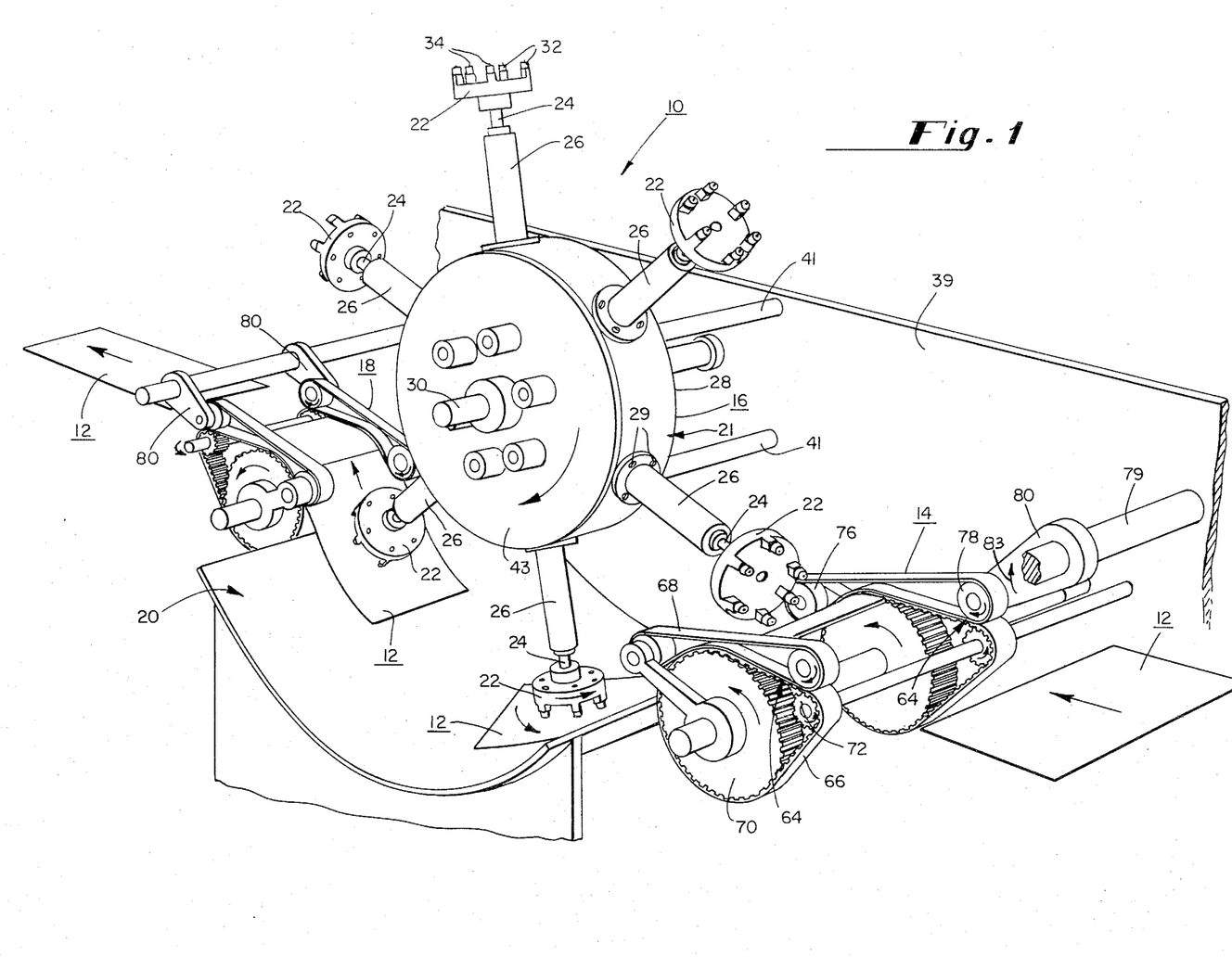
FIG. 1 is a perspective view of apparatus of this invention.

Referring to FIG. 1, an apparatus 10 for turning at least one moving, discrete flexible web product 12 includes an inlet conveyor 14, a turning section 16 and an outlet conveyor 18. The turning section 16 includes a concave, substantially cylindrical support surface 20 onto which web products 12 are directed in single file order by the inlet conveyor 14. The substantially cylindrical support surface 20 preferably is a singly-curved surface (i.e. a surface having a substantially straight line configuration in transverse cross-section), and preferably is a portion of a cylinder or cone. One surface which has been utilized with success in this invention is a concave, cylindrical surface having a radius of curvature of 2 feet, and extending through an arc of approximately 120°.

Figure 4:
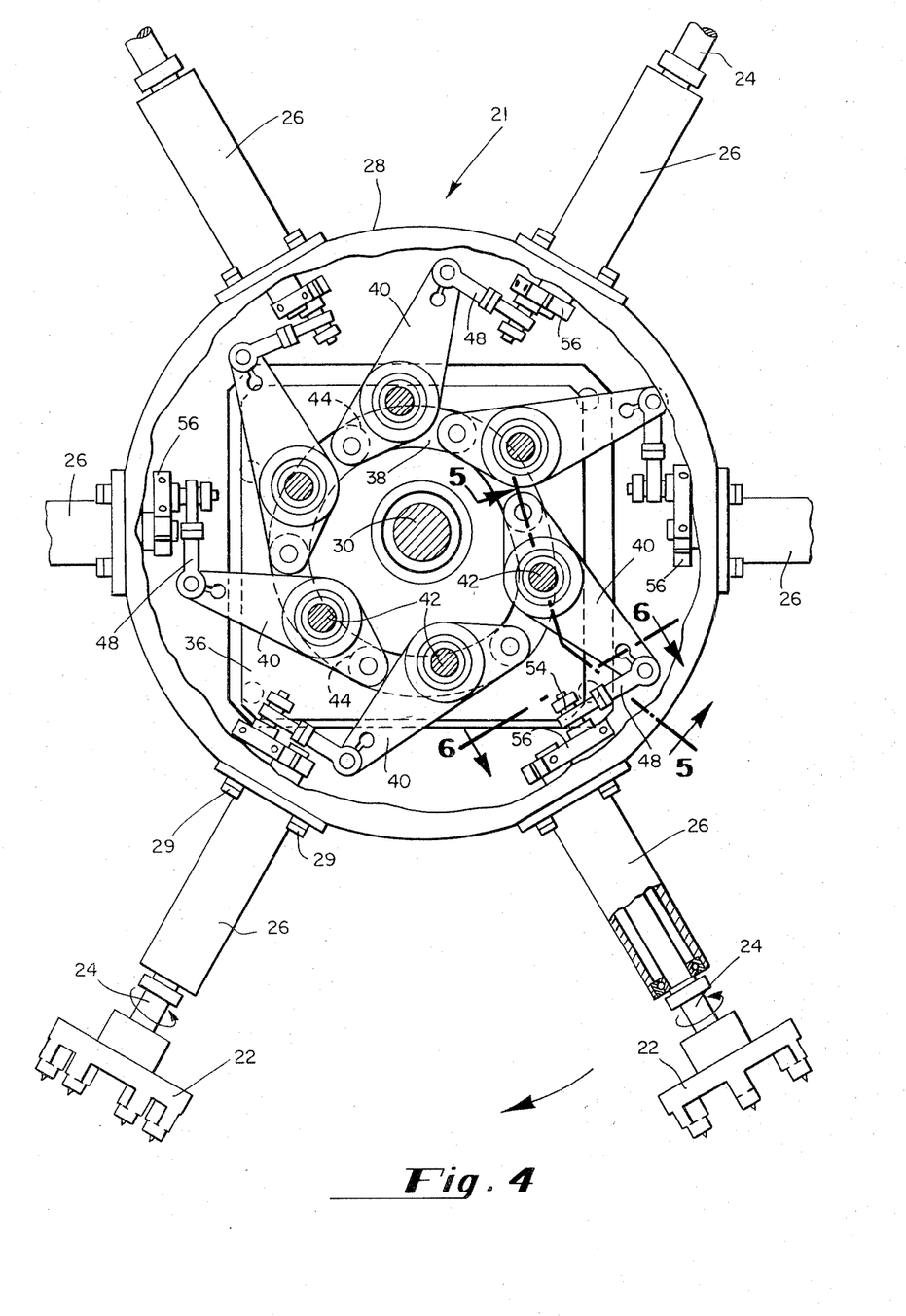
FIG. 4 is a front elevation view of the turning head assembly with the front cover of the turret removed to show details of construction.

Referring to FIGS. 1 and 4, the turning section 16 includes a turning head assembly 21. This turning head assembly 21 includes a plurality of turning heads 22, each of which is fixedly secured to a shaft 24 which is mounted for rotation in a bearing-support sleeve 26. The bearing-support sleeves 26 are secured to a rigid, cylindrical turret 28 by suitable fastening means, such as bolts 29 (FIGS. 1 and 4). The turret 28 is keyed to a driven axle 30 which is driven by conventional drive means (not shown) in synchronism with the arrival of web products at the apparatus 10. The shafts 24 extend in a spoke-like fashion from the axle 30 so that rotation of the turret 28 sweeps the turning heads 22 through an arc which is concentric with the concave curvature of the support surface 20. Each turning head 22, in the preferred embodiment of this invention, includes a plurality of projections 32 having impaling pins 34 extending outwardly therefrom for engaging a web product 12 by piercing through the upper face of said web product (FIG. 1).

Referring to FIGS. 1 and 4–7, actuating means are associated with the turning head assembly 21 for rotating the turning heads 22 about the axes of their respective mounting shafts 24 through a predetermined arc as the turret 28 is rotated by means of the driven axle 30. The actuating means includes a stationary cam 36 having a cam track 38 therein (FIG. 4). The cam 36 is mounted in a fixed position to structural framework 39 through a plurality of struts 41 (two of which are shown in FIG. 1). The turret 28 is rotated relative to the stationary cam 36 through the driven axle 30.

Referring to FIGS. 4–7, the turning heads 22 are rotated about their respective mounting shafts 24 through identical linkage assemblies. Therefore, for the purpose of brevity, only one of the linkage assemblies will be described. A bell crank lever 40 is mounted for oscillatory motion intermediate its ends on a shaft 42 which is fixedly secured to a front wall 43 of the turret 28. A cam follower 44 is secured to one end of the bell crank lever 40, and this cam follower rides in the cam track 38 as the turret 28 is rotated. As a result of the cam follower-cam track connection oscillatory motion is imparted to the bell crank lever 40 in the general direction indicated by double-headed arrow 46 (FIGS. 6 and 7) as the turret 28 is rotated.

Figures 6, 7:
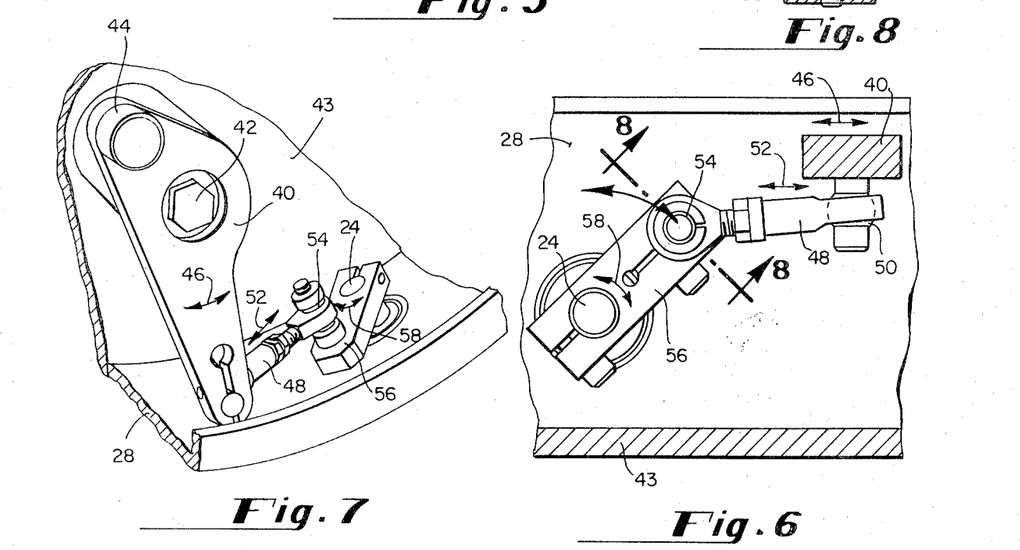
FIG. 6 is a sectional view along line 6—6 of FIG. 4.
FIG. 7 is a fragmentary isometric view of the linkage assembly for rotating one turning head looking toward the front cover with the cam removed.

The opposite end of the bell crank lever 40 is connected to one end of a coupler link 48 through a universal pivot, such as a ball joint connection 50 (FIG. 6). As a result of this connection the coupler link 48 will have a reciprocating motion imparted thereto, substantially in the direction indicated by the double-headed arrow 52 (FIGS. 6 and 7).

The opposite end of the coupler link 48 is connected through a universal pivot such as a ball joint connection 54 (FIGS. 6–8) to one end of a driven lever 56. The driven lever 56 is attached adjacent its opposite end to the shaft 24 to which a turning head 22 is fixedly secured. In this manner the motion of the coupler link 48 is converted into arcuate movement of the driven lever 56 substantially as indicated by the double-headed arrow 58 (FIGS. 6 and 7). This arcuate movement of the driven lever 56 is transmitted to the shaft 24 to cause the turning head 22 fixed to said shaft to rotate through a predetermined arc as the turret 28 is rotated to sweep the turning head in a path concentric with the concave, substantially cylindrical support surface 20.

Figures 5, 8:
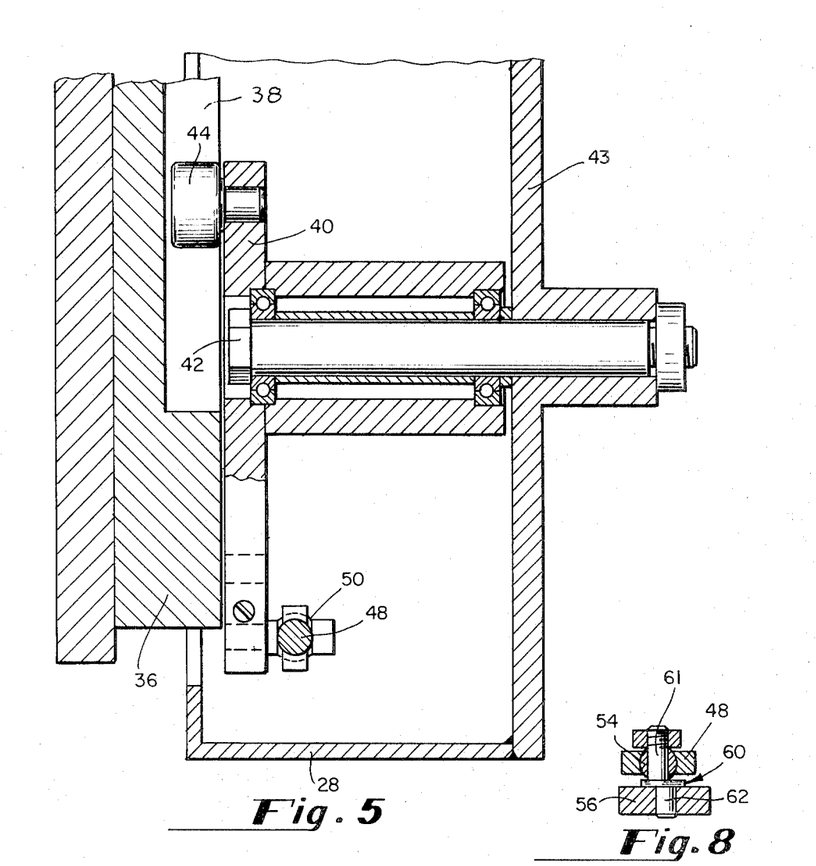
FIG. 5 is a sectional view along line 5—5 of FIG. 4.
FIG. 8 is a sectional view along line 8—8 of FIG. 6.

One means of varying the number of degrees through which the turning head is rotated is to vary the length between the universal pivot 54 and the shaft 24. Referring to FIG. 8, this length can be adjusted by attaching the coupler link 48 to the driven lever 56 through a coupler 60 which includes a upper shaft 61 disposed eccentrically to lever-attachment shaft 62. The lever-attachment shaft 62 is attached to the driven lever, and the ball joint associated with the coupler link 48 is attached to the upper shaft 60. When it is desired to change the length between the pivot 54 and the shaft 24, the lever-attachment shaft 62 can be rotated within the driven lever to move the eccentically mounted shaft 61 either closer to, or further away from the shaft 24.

Figure 2:
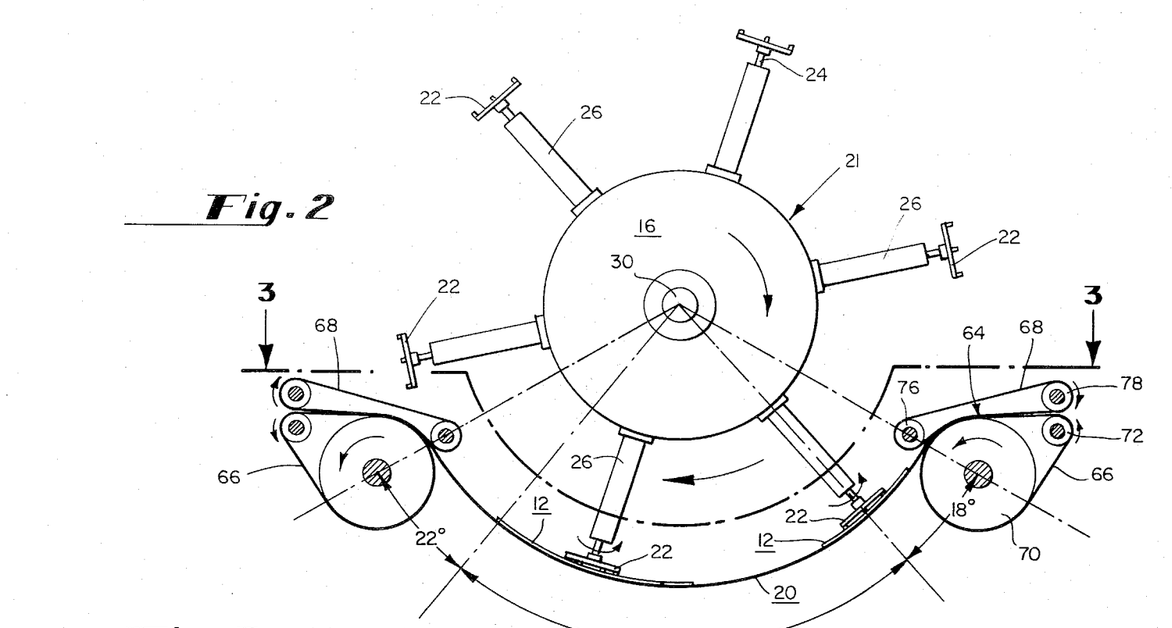
FIG. 2 is a schematic side elevation view of apparatus of this invention.

The inlet conveyor 14 and outlet conveyor 18 can include any conventional conveying means for directing web products onto the substantially cylindrical support surface 20 and conveying web products away from said support surface 20 after said web products have been turned through a predetermined number of degrees. Referring to FIGS. 1 and 2, a preferred construction of the inlet conveyor 14 and outlet conveyor 16 includes cooperating pairs of belts 64 disposed adjacent opposite sides of the web products 12; however, it is within the scope of this invention to utilize only one pair of such belts. Suitable side guides (not shown) which do not interfere with web product travel can be provided for each belt to maintain proper tracking of said belts. Each pair of belts is identical, and includes a lower belt 66 and an upper belt 68. Each lower belt 66 preferably is a timing belt which is in wrapping engagement with spaced pulleys 70–72, respectively, to define a horizontal pad-engaging run therebetween. One of the spaced pulleys 70–72 is positively driven to effect movement of each lower belt 66. Each upper belt 68 is in wrapping engagement with spaced idler pulleys 76–78, respectively. The pulleys 76–78 bridge the pulley 70, and are positioned to cause a lower run of the upper belt 68 to partially wrap the lower belt 66 at pulley 70 to provide a curved product gripping nip. The lower run of each upper belt 68 cooperates with the horizontal pad-engaging run of its respective lower belt 66 to form a substantially horizontally disposed product gripping nip upstream of the curved product gripping nip. The upper pulleys 78 are mounted for pivotal movement, as indicated by arrow 83, about a shaft 79 through pulley-support arms 80. This pivotal mount permits self-adjustment of the gripping nip to accommodate variations in product thickness. The web products 12 are directed in a horizontal direction through the horizontal gripping nip, and are turned about the pulleys 70, as a result of the wrapping engagement of the belts 66 and 68 with said pulleys, to thereby direct each web product onto the substantially cylindrical support surface 20 substantially tangentially thereto.

In the preferred embodiment of this invention the outlet conveyor 16 is of the same construction as the inlet conveyor 14, and is adapted to grip the web products 12 as they are moving tangentially to the cylindrical support surface 20, and gradually turn the web products to convey them in a horizontal plane to other regions of the converting equipment. Preferably, the horizontal plane along which the web products are directed after being turned is substantially the same as the horizontal plane along which the web products are fed prior to being directed tangentially into the turning section 16.

Figure 3:
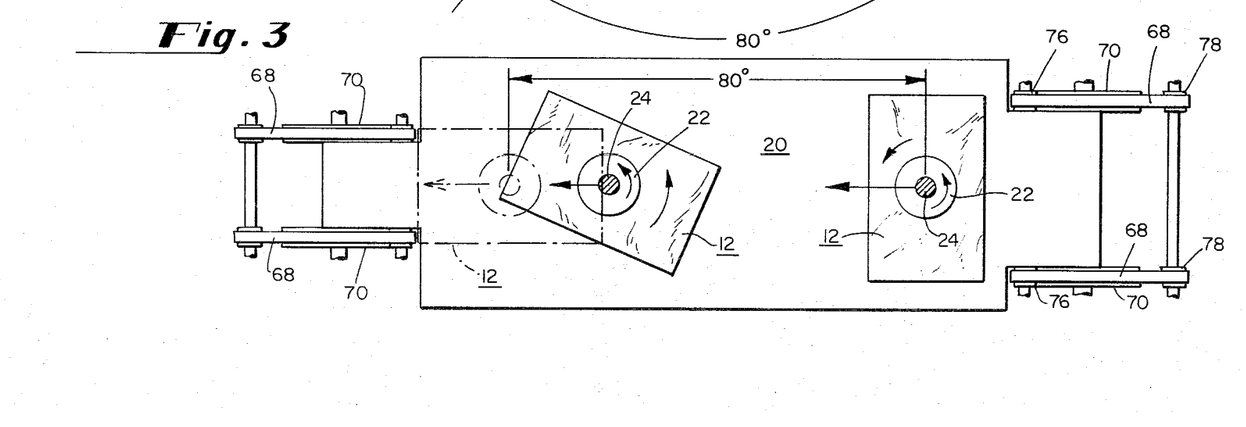
FIG. 3 is a view along line 3—3 of FIG. 2.

Referring to FIGS. 2 and 3, a preferred operation of the apparatus 10 is shown in which a plurality of flexible web products 12 is directed in single file order into the turning section 16, rotated within their own plane through an angle of approximately 90°, and removed from said turning section. In this preferred embodiment, each turning head 22 engages a respective web product while it is still engaged by the inlet conveyor 14 to provide positive controlled transfer of each web product from the inlet conveyor to the turning section 16. Each turning head 22 is moved at substantially the same speed as the inlet conveyor 14 to assure that this positive controlled transfer takes place. In a like manner, each web product 12 remains engaged with its respective turning head 22 as said web product is initially engaged by the outlet conveyor 18 to establish positive controlled transfer of each web product from the turning section 16 to the outlet conveyor.

According to the mode of operation indicated in FIG. 2, the substantially cylindrical support surface 20 has a radius of curvature of approximately 2 feet and extends through an arc of approximately 120°. Each turning head 22 engages a respective web product 12 and moves said web product along the cylindrical support surface 20 through an arc of approximately 18° without turning said web product. This distance is designed to insure that each web product clears the inlet conveyor before any attempt is made to turn it. The 90° rotation of the web product is effected gradually through approximately 80° of movement of the turning head, and no further turning of the web product is effected through the last 22° of movement of the web product over the turning surface 20. In this manner, the web product will be completely turned prior to being engaged at its leading end by the outlet conveyor 18. During the remaining approximately 240° of movement each turning head is reset by the cam 36 to a position for turning a subsequent web product.

The above-described mode of operation has been utilized in turning rectangular disposable diapers having a short dimension of from about 10 inches to about 15 inches, and a long dimension of from about 14 inches to about 18 inches. The specific arc lengths through which the web products travel without being turned, as well as the arc length of travel during the turning operation can be varied, but are always chosen to avoid interference of the inlet and outlet conveyors with the web products as said web products are being turned. It is important to this invention that the web products 12 be fed to the apparatus 10 at a substantially constant spacing and speed so that each web product 12 will be engaged by a corresponding turning head 22. Preferably the web products are fed to the apparatus 10 by the apparatus disclosed in U.S. patent application Ser. No. 311,453, filed Dec. 4, 1972, and assigned to Scott Paper Company. This latter apparatus can be utilized to receive the turned web products 12, and readjust the spacing between said web products if desired.

Having described my invention, I claim:

1. An apparatus for turning a moving discrete flexible web product within its own plane, said apparatus including, in seriatim, an inlet conveyor, a turning section and an outlet conveyor, the improvement in which the turning section includes:
    a. a concave, substantially cylindrical support surface for supporting a face of said web product received from said inlet conveyor;
    b. a turning head having web-product engaging means, said turning head being mounted for movement along a path concentric with, and closely spaced to said substantially cylindrical support surface to confine at least a portion of the web product between the web-product engaging means of the turning head and said support surface and to move said web product over said support surface; and
    c. actuating means for rotating said turning head through a predetermined number of degrees about an axis substantially perpendicular to said web product as said turning head moves along said concentric path, whereby said web product is rotated through a predetermined arc within its own plane for delivery to said outlet conveyor.

2. The apparatus according to claim 1 for turning a plurality of discrete flexible web products received in single file order from said inlet conveyor; said apparatus including a plurality of said turning heads, all of said turning heads being mounted for movement along the same concentric path with, and closely spaced to said substantially cylindrical support surface, each turning head having web-product engaging means adapted to confine at least a portion of said web product between said turning head and support surface and move said web product over said support surface, and actuating means for rotating each of said turning heads through a predetermined number of degrees about an axis substantially perpendicular to its engaged web product as each of said turning heads moves along its concentric path, whereby each of said web products is rotated through a predetermined arc within its own plane for delivery, in single file order, to the and conveyor. thereof, 3. The apparatus according to claim 1, wherein said inlet conveyor and outlet conveyor each include at least one cooperating pair of gripping surfaces for gripping said web product; said cooperating pairs of gripping surfaces of said inlet conveyor defining a substantially horizontal gripping nip at the upstream end thereof thereof, a substantially curved gripping nip adjacent the downstream end thereof whereby said inlet conveyor grips a web product moving in a substantially horizontal plane and turns said web product in said curved gripping nip for directing said web product tangentially onto the substantially cylindrical support surface, said cooperating pairs of gripping surfaces of said outlet conveyor defining a substantially curved gripping nip adjacent the upstream end thereof and a substantially horizontal gripping nip adjacent the downstream end thereof, whereby said web product is gripped in said curved gripping nip as it is fed tangentially off said cylindrical support surface and is turned into a substantially horizontal plane into said horizontal gripping nip.

4. The apparatus according to claim 3, wherein said inlet conveyor and outlet conveyor each include two cooperating pairs of gripping surfaces transversely spaced with respect to each other for gripping said web product adjacent side margins thereof.

5. The apparatus according to claim 1, wherein said turning head is attached to a shaft which is rotatable about its axis, said shaft being mounted on a rigid turret, a stationary cam having a cam groove of a predetermined configuration, a drive lever mounted intermediate its ends to said turret for oscillatory movement, one end of said drive lever having a cam follower engaging said cam groove and the other end of said drive lever being connected through a universal pivot to one end of a coupler link, a driven lever secured adjacent one end thereof to the shaft of said turning head and being connected adjacent its opposite end through a universal pivot to the other end of said coupler link, and means for rotating said turret about a fixed axis, whereby said cam follower moves along said cam groove to oscillate said drive lever, the oscillatory movement of said drive lever being converted into axial rotation of the shaft through the coupler link and driven lever connection.

6. The apparatus according to claim 5, including means for adjusting the linear distance between the coupler connection to the driven lever and the turning head shaft connection to the driven lever to thereby vary the number of degrees of rotation through which said turning head is rotated about its attached shaft axis.

7. An apparatus for turning a moving discrete flexible web product received from an inlet conveyor and for delivering the turned web product to an outlet conveyor, said apparatus comprising:
    a. a concave, substantially cylindrical support surface for supporting a face of said web product received from said inlet conveyor;
    b. a turning head having web-product engaging means, said turning head being mounted for movement along a path concentric with, and closely spaced to said substantially cylindrical support surface to confine at least a portion of the web product between the support surface and web-product engaging means and to move said web product over said support surface; and
    c. actuating means for rotating said turning head a predetermined number of degrees about an axis substantially perpendicular to said web product as said turning head is moved along said concentric path, whereby said web product is rotated through a predetermined arc within its own plane as it is moved along said substantially cylindrical support surface for delivery to said outlet conveyor.

8. The apparatus according to claim 7 for turning a plurality of discrete flexible web products received in single file order from said inlet conveyor, said apparatus including a plurality of said turning heads, all of said turning heads being mounted for movement along the same concentric path with, and closely spaced to said substantially cylindrical support surface, each turning head having web-product engaging means adapted to confine at least a portion of said web product between said turning head and support surface and move said web product over said support surface, and actuating means for rotating each of said turning heads through a predetermined number of degrees about an axis substantially perpendicular to its engaged web product as each of said turning heads moves along its concentric path, whereby each of said web products is rotated through a predetermined arc within its own plane for delivery, in single file order, to an outlet conveyor.

9. The apparatus according to claim 7, wherein said turning head is attached to a shaft which is rotatably mounted about its axis to a turret, a stationary cam having a cam groove of a predetermined configuration, a drive lever mounted intermediate its ends to said turret for oscillatory movement, one end of said drive lever having a cam follower engaging said cam groove and the other end of said drive lever being connected through a universal pivot to one end of a coupler link, a driven lever secured adjacent one end thereof to the shaft of said turning head and being connected adjacent its opposite end through a universal pivot adjacent to the other end of said coupler link, and means for rotating said turret about a fixed axis, whereby said cam follower moves along said cam groove to oscillate said drive lever, the oscillatory movement of said drive lever being converted into axial rotation of the shaft through the coupler link and driven lever connection.

10. The apparatus according to claim 8, including means for adjusting the linear distance between the coupler connection to the driven lever and the turning head shaft connection to the driven lever to thereby vary the number of degrees of rotation through which said turning head is rotated about its attached shaft axis.

* * * * *

PO-1050
(5/69)

UNITED STATES PATENT OFFICE
CERTIFICATE OF CORRECTION

Patent No. 3,847,273                     Dated     November 12, 1974

Inventor(s)    Eric S. Buhayar

It is certified that error appears in the above-identified patent and that said Letters Patent are hereby corrected as shown below:

Column 7, line 49, after "the" insert --outlet--, delete "and",
Column 7, line 50, delete "thereof,"
Column 7, line 58, delete "thereof" (second occurrence) and substitute therefor --and--.
Column 7, line 59, after "thereof" insert --,--.
Column 8, line 62, after the word "conveyor" delete "," and substitute therefor --;--.

Signed and Sealed this

Twenty-sixth Day of October 1976

[SEAL]

Attest:

RUTH C. MASON
Attesting Officer

C. MARSHALL DANN
Commissioner of Patents and Trademarks